United States Patent
Gilliam et al.

[11] Patent Number: 5,878,214
[45] Date of Patent: Mar. 2, 1999

[54] COMPUTER-BASED GROUP PROBLEM SOLVING METHOD AND SYSTEM

[75] Inventors: Terry K. Gilliam, Southlake, Tex.; Richard A. Harriman, Cambridge, Mass.

[73] Assignee: Synectics Corporation, Cambridge, Mass.

[21] Appl. No.: 891,171

[22] Filed: Jul. 10, 1997

[51] Int. Cl.$^6$ .................................................. G06F 15/00
[52] U.S. Cl. .................. 395/200.34; 345/501; 455/12.1; 379/202; 379/203; 379/88.11; 379/88.12
[58] Field of Search .............................. 348/15, 17, 94.3; 379/202, 203, 204, 88.09, 88.11, 88.12, 93.01, 93.21; 345/501; 395/200.34; 455/12.1; 370/467

[56] References Cited

U.S. PATENT DOCUMENTS

| | | | |
|---|---|---|---|
| 5,263,869 | 11/1993 | Ziv-El | 395/200.34 |
| 5,434,797 | 7/1995 | Barris | 364/154 |
| 5,490,247 | 2/1996 | Tung et al. | 395/200.04 |
| 5,491,797 | 2/1996 | Thompson et al. | 395/200.03 |
| 5,592,478 | 1/1997 | Weiss | 395/200.34 |

*Primary Examiner*—Parshotam S. Lall
*Assistant Examiner*—Khanh Quang Dinh
*Attorney, Agent, or Firm*—Devine, Millimet & Branch, P.A.; Paul C. Remus, Esq.; Kristin Kohler, Esq

[57] ABSTRACT

A computer-based method of innovatively solving one or more problems using a group assembled at a computerized meeting. One participant of the group is the client who is the owner of or is responsible for the problem or opportunity to be resolved. Each participant is provided with a computer which is networked with all other computers. A group list is created of all the participants of the group, and one participant is designated the facilitator who controls the problem solving process of the meeting. The remaining participants are designated as resources. An agenda is created consisting of placeholders and activities. The resources enter creative springboards into their computers based on the problem to be solved, and these springboards are distributed to all participants. Builds and elaborations are generated by the resources based on the springboards and distributed to all participants. Participants are polled about their opinions about the springboards, and one or more beginning ideas are selected based on high newness and intrigue. Participant engage in excursions to gather action oriented ideas concerning the beginning ideas. Action oriented ideas are selected to become emerging ideas, and positive aspects and concerns are identified. Excursions are then used to resolve the concerns about the emerging ideas. Emerging ideas are selected as possible solutions if the emerging ideas have an element of newness, the ideas are feasible, and the group is committed to implementing the idea. Finally, actions are listed; accountability is assigned; and time lines are generated to implement the possible solutions.

23 Claims, 1 Drawing Sheet

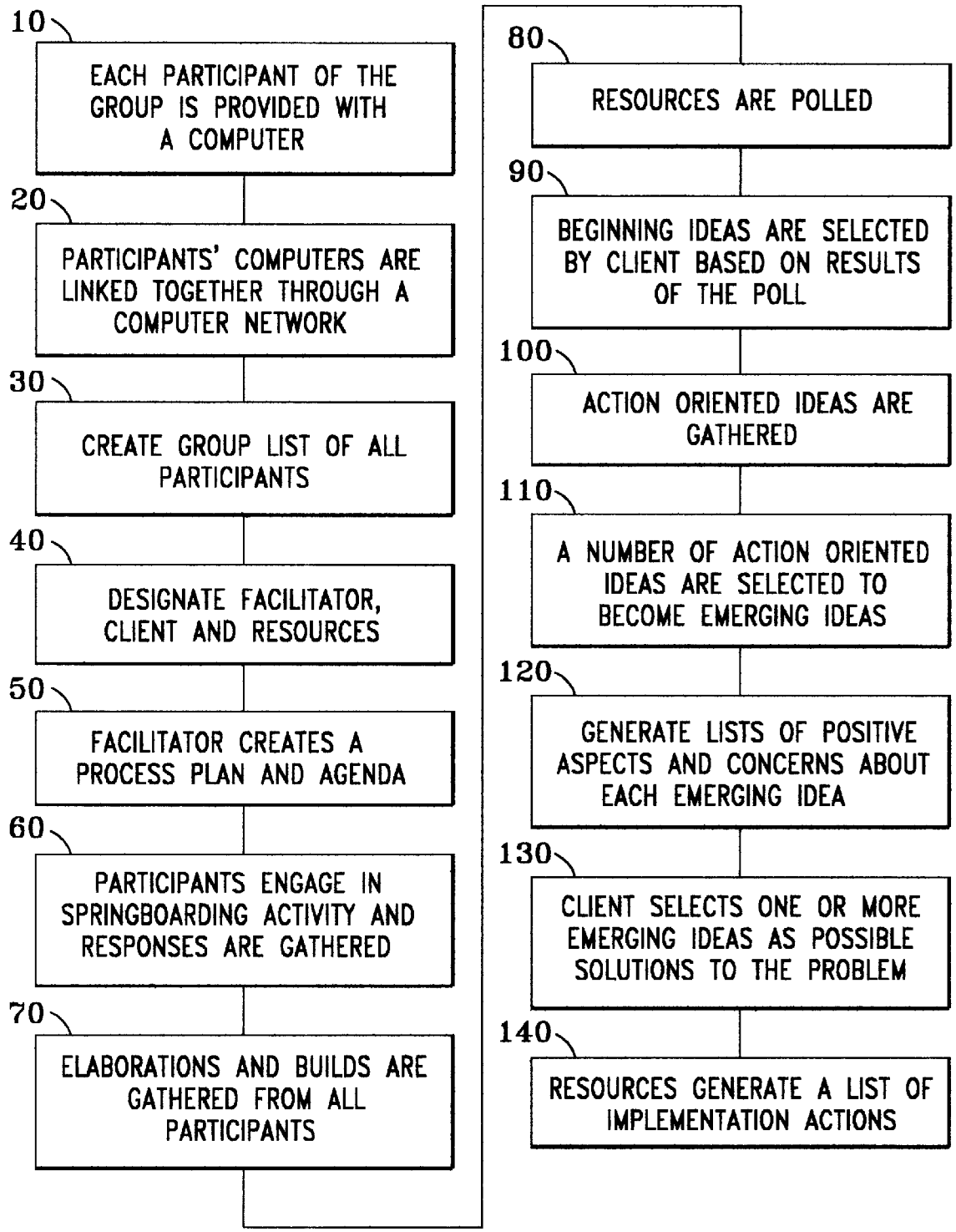

COMPUTER-BASED GROUP PROBLEM SOLVING METHOD AND SYSTEM

BACKGROUND OF THE INVENTION

This invention relates to computerized group decision support systems. Specifically the invention involves the computerized implementation of a modification of the Synectics innovative problem solving methodology and innovation body of knowledge.

Decision making processes in business are often haphazard, unstructured and unorganized affairs. Lack of teamwork, poor skills in personal interaction, disorganization and fear of risk taking plague organizations interested in innovation and growth. No systematic methodology for spurring innovation has been successfully developed to allow teams of individuals, large or small in number, whether in a single room or around the globe, to tackle and conquer tough problems.

One method of sparking innovation through teamwork and collaboration uses the Innovative Teamwork Program ("ITP"). Synectics ITP embodies processes utilized by a team of eight to ten participants to solve problems. One participant, the client, is the owner of the problem and designates the problem to be solved. Another participant is designated the facilitator, while the remaining members of the team are designated as problem solving resources. The facilitator acts as the neutral process manager of the team, designing a process plan to meet the team's objectives, keeping track of time, developing and managing an agenda and ensuring full participation of all members of the team. Resources are expected to wrestle with the problem and devise solutions. A critical teaching of the Synectics ITP is that there are three channels of communication: words, tones and non-verbals. Synectics ITP teaches that it is especially true in problem solving meetings that participants focus on the non-verbal and tonal communications because they account for 93% of the message being communicated. Synectics has a five step method of problem solving: defining the task; exploring thoughts about the task; selecting areas for further development; developing and refining those areas; and creating an action plan for implementation of ideas. This five step method organizes problem solving meetings and encourages innovation.

While the Synectics methodology excels at solving the problems of lack of organization, lack of innovative thought, and poor interpersonal skills among team members, the Synectics methodology does not address all of the problems in innovative problem solving. As stated in the preceding paragraph, Synectics requires that there be no more than eight to ten people in a Synectics problem solving team. In addition, all team members must be located in the same room during a Synectics session. Because of the vocal nature of Synectics communication, only one team member may speak at a time, thus limiting participation. In addition, since all members of the team are physically present in the same room, only one area or problem may be investigated at a given time. Because all of the participants are face to face, there is less risk taking than a more anonymous process would produce. Also, since physical presence is required in a Synectics session, each individual can only participate in one problem solving team at a time. Another limitation is that Synectics teaches against remote team members participating in a problem solving session because of the importance of the non-verbal cues to communications.

Many problem solving methodologies have attempted to solve the problem of group interaction through the use of formal methodologies. Others have focused on solving the problems of remote team members. Existing interactive group communication systems have advanced the ability of remote team members to share documents and comments over a computer network, but they have no formal methodology that addresses problem solving.

It is known in the prior art to link various computer systems together and share data between the different systems. It is also known in the prior art of interactive group communication systems to simultaneously update shared documents, simultaneously conference a single individual in multiple problem solving teams, and plan meeting agenda using computerized planning programs. The limitation of all of the prior art in the area of interactive group communication systems is they provide no guidance or structure for creative problem solving. While the prior art enables the physical communication systems necessary for remote group interaction, it does not provide, anticipate, disclose or enable any method of leveraging these systems to enhance group decision making or to spur innovation.

For the foregoing reasons, there is need for a computerized group decision support system that allows participation by large numbers of team members, some of whom may be located in remote locations. There should be no degradation of results due to larger numbers of participants. In fact, having as many as forty or fifty participants should lead to enhanced results and innovations, as diversity enriches innovative problem solving.

Furthermore, a system is needed that allows simultaneous participation in the creative problem solving effort by more than one member of the team and permits more than one aspect of the problem to be tackled simultaneously by the team. More than one team member should be able to speak to the problem at the same time. The conventional limitation of a single speaker at a time should be eliminated. A problem should be able to be broken down into multiple suggestions and actions. Each suggestion should be able to be investigated by some team members without disturbing other team members.

Also, a system is required that will facilitate the development of creative and novel ideas when team members encounter a dead end in their thought processes. The system should spur creative thinking and free members of teams from the conscious mental constraints and socially imposed limitations that have been placed upon them. Such a system should allow the problem solvers to shed their current paradigms and embrace creative responses based on high newness and personal intrigue.

In addition, a system is required that encourages innovation and allows individuals to be participants of more than one problem solving team. While sitting at a computer console at one's desk, an individual should be able to participate in more than one problem solving team. That individual should be able to switch from team to team with a minimum of effort.

There is also a need for a computerized system that has a formal methodology that encourages innovation while maintaining a structured problem solving process. It is not enough that this new system provide the tools to interact; the new computerized system should be a true creative problem solving system which helps to lead participants through the problem solving process and to innovative solutions.

Whatever the merits of prior problem solving systems, they do not achieve the benefits of the present invention.

SUMMARY OF THE INVENTION

The present invention is directed to a process and apparatus that satisfies the need for a computerized group decision support system that: provides a formal innovative problem solving methodology; allows participation by large numbers of individuals; permits participants to be in multiple locations; encourages parallel problem solving; and permits individuals to be resources of multiple problem solving teams. The present invention solves these problems through the following steps.

The invention provides each participant of the problem solving group with a computer, with each participant's computer networked to other participant's computers. A group list is created, from which one participant is designated as the facilitator, one or more as the client and the remaining participants become resources. Once an agenda is created by the facilitator, in consultation with the client, responses are gathered from the resources regarding the problem to be solved. These responses, called springboards, are distributed amongst the participants and are available to the participants for elaboration and building. Resources are polled about the springboards holding the greatest potential to resolve the problem or opportunity, and polling results are distributed among the participants. Based on this polling information, beginning ideas are formed by the client for further action. Resources offer action oriented ideas about how to accomplish the beginning ideas, and one or more action oriented ideas are selected to be developed by the group into emerging ideas. Resources generate a list of positive aspects of each emerging idea and a list of concerns about each emerging idea. After further exchanges to resolve concerns, some of the emerging ideas are selected by the client as possible solutions based on several criteria, and a list of actions is generated in order to implement the selected emerging ideas.

BRIEF DESCRIPTION OF THE DRAWINGS

These and other features, aspects, and advantages of the present invention will become better understood with regard to the following description, appended claims, and accompanying drawings where:

FIG. 1 shows a flowchart of an embodiment of the invention.

DETAILED DESCRIPTION OF THE INVENTION

This invention is executable on any computer system running Microsoft Windows 3.1 or Microsoft Windows 95 operating system. Such a system typically includes an Intel Pentium, Pentium Pro, or Pentium MMX processor, RAM storage, hard disk storage, floppy disk storage, a keyboard, pointing device such as a mouse, and a monitor. While this describes a typical system on which this invention is executable, this invention may also run on any future upgrades to the Windows operating system. This invention could also be ported to other operating systems such as OS/2, NeXT, or MacOS.

For this invention to be fully functional, a plurality of such computer systems would have to be networked together through any networking scheme supported by the Windows 95 or Windows 3.1 operating systems. Typical of such networks are Novell and DECNET, although any Windows supported network will suffice. An additional networking methodology that has proven especially useful for this application is the WinFrame networking application from Citrix Systems, Inc. of Coral Gables, Fla. Citrix WinFrame is run on a server to which the individual participant's computers are linked. A "plug-in" is downloaded by each of the participant's computers, which makes it appear as though the computer-based problem solving methodology disclosed herein is running on each individual computer, when in fact, only the interface is downloaded to each computer. In this manner, all processing is performed by the server, which speeds up the interchange and flow of information amongst the meeting participants.

As shown in FIG. 1, a process according to the present invention involves the following steps. Participants comprise the client, the facilitator and resources. Each participant of the group should be provided with a computer in block 10. Often the group participants will have access to their own computers at their desks, or homes, in which case only appropriate software need be supplied. Participants may also be supplied with computers through the use of a computerized group decision support computer facility where dedicated computers exist for this purpose and resources are seated at one of these machines. All of these computers must then be linked together through a computer network in block 20, and all resources log onto the system. The computer network does not need to be physically tied together for the computer network to function. Computers at remote sites may be linked by modems and phone lines, T1 connections, ISDN connections, radio modems, or cellular links. In this manner group resources may be scattered throughout the world, and innovative problem solving teams are not limited by geography.

Once all participants are logged onto the system through the network, a group list of all participants is created in block 30. This group list allows the invention to keep track of everyone participating in the problem solving process. The group must then designate one participant of the group as the facilitator, one or more participants as the client, who is the owner of or responsible for the problem to be resolved and the remaining participants are designated as resources as shown in block 40. The facilitator acts in the important role as a process planner and mediator to move the problem solving process along the steps to a successful conclusion. The facilitator is both an advisor and an enabler of the process. The remaining non-client participants of the group become resources. The resources and the client are the true problem solvers of the process through their various contributions to the problem solving effort.

Next in block 50, the facilitator creates the process plan and an agenda for the meeting. This agenda comprises of placeholders and activities. Placeholders are reminders to the group of the various activities taking place. One example of such a placeholder is the task headline. The task headline reminds the group of the focus of the meeting. This task headline is typically one sentence long. Task headlines are but one example of placeholders, and placeholders may be used for any type of reminder to the group and may be scattered through the agenda. The analysis highlight activity provides participants with specific information about the task headlines. Other activities include gathering responses to the problem (this activity is also known as springboarding), gathering comments about and elaborations upon the responses, polling resources' opinions, the selection of beginning ideas, gathering action oriented ideas, shaping emerging ideas, responding to the pluses and drawbacks of emerging ideas, identifying possible solutions, and listing actions for implementation. Springboards consist of a springboard activity where resources enter ideas, thoughts, connections, options, analogies, and the like, known as springboards, into their computers and these springboards are displayed on other participants' computers. In this manner, all participants of the problem solving group are active at the same time. There is no need to limit speech to one participant at a time. Thus, time is saved in the response gathering process, and the synergy of multiple ideas prompts more in-depth thinking among resources. These activities may be scheduled for a particular time and a particular duration, or such scheduling, can be done on an ad hoc basis by the facilitator. The critical aspect of the agenda is that the process flow is controlled by the facilitator.

During the response gathering or springboarding activity completed in block 60, elaborations and builds are gathered from all participants, including the client in block 70. The comments may also reflect concerns or refinements of the responses previously gathered from the resources in block 60. This accumulation of feedback is displayed on all participants' computer monitors, just as such a list of responses was generated and displayed in block 60. This step of the process has similar benefits to block 60, in that all resources may enter comments simultaneously to generate faster results. Because all of these inputs from resources may be anonymous, ideas are more freely exchanged because people are less self-censoring. Barriers between various levels of management are eliminated in an anonymous entry system because the usual deference to those of higher authority need not be shown.

Following the completed submission of comments in block 70, a poll of resources is taken in block 80. This is a poll about the various comments previously submitted. Eight different polling methods are envisioned in this embodiment of the invention, although numerous other polling methods will also work. Polling may be by rank order, whereby each resource lists the comments in order of preference. Polling may be based on a ten point scale where each comment is given a score of one to ten. Also, resources may choose a set number of selections from the comments as their comments of choice. Resources may vote yes or no or true or false to each comment. Resources may indicate their degree of agreement with a comment on a four or five point scale. The facilitator may also choose a custom method of polling, including evaluating each springboard against specific criteria established by the client and problem solving team before the meeting began. Regardless of which polling method is chosen, it is the facilitator who does the actual selection of which polling method will be used. Once the polling of resources is complete the results of the poll may be displayed in a number of matrix, graphical or tabular forms. Such forms include bar charts, line charts, pie charts, two and three dimensional graphs or tables. Polling results may also be exported to other applications for analysis. Polling results are available for display to all participants.

In block 90, beginning ideas to solve the problem are selected by the client based on the result of the poll. The resources decide which of the comments will become beginning ideas with the aid of the facilitator. The beginning ideas are distributed to all participants for viewing on their personal monitors.

Based on the beginning ideas generated in block 90, action oriented ideas are gathered from the resources in block 100. The gathering of these action oriented ideas is similar to the gathering of responses in block 60. All resources simultaneously enter their action oriented ideas on their computers, with each of these ideas distributed to all participants through the computer network. The facilitator determines the scheduling and length of time of this step of the process, based on feedback from the client.

In block 110, a number of action oriented ideas is selected to become emerging ideas. The selection process can be accomplished through the use of polling as performed in block 80 or through a less formal process. This emerging ideas list is distributed to all resources of the group.

The next step in the process is to imagine each emerging idea in action and then to generate two lists in block 120. One list will consist of positive aspects of each emerging idea. The second list will be a list of all concerns about each emerging idea, which concerns comprise additional problems solved by the client and the resources. Resources simultaneously enter their thoughts on each of these lists with the lists being viewed by all participants on their monitors. The facilitator determines the scheduling and timing of this list generation process. As with all aspects of this invention, this is an anonymous process that will generate more candid feedback.

At this point in time, the client identifies one or more emerging ideas, which are modified to incorporate the results of the group's work to overcome concerns, as possible solutions to the problem being solved. The possible solutions should be new, feasible and there must be commitment among the resources to implement the solution. Block 130 is where this part of the process takes place in our flow diagram.

Finally, the resources generate a list of implementation actions in block 140. These are concrete steps to implement the solutions found in block 130. Block 130 established the final buy-in by the resources of the process and solutions, and block 140 acts to hold the resources accountable for actually implementing the ideas.

A critical part of this innovative problem solving process is the use of excursions. Excursions are used to aid in the generation of ideas based on high newness and intrigue, i.e. creative and novel ideas. Excursions can be used at any point in the idea generation processes when the resources capacity for generating new ideas has run dry, when more speculative ideas are wanted by the client and facilitator, or when a breakthrough is needed. For instance, an excursion might be entered into by the facilitator during the springboard activity, the ways and means activity (action ideas) or when generating ideas to overcome concerns. Excursions relax the resources strong internal censoring mechanisms and help them take a mental vacation from the problem at hand.

The excursion activity is a three step process. First, the problem being worked on is temporarily put out of the minds of the client and the resources. Second, the facilitator focuses the resources upon one or more topics unrelated to the problem being solved. The unrelated topic may be presented in the form of a keyword from a world unrelated to the problem or by focusing the participant's attention on an object unrelated to the problem or by giving the participants a new identity from which to think about the problem or by guiding them into imagery from which they bring back new material to associate with the problem. The material has no apparent relation to the problem at hand and is used to provoke associations and thoughts from the resources. The resources will generate a list of associations based on this material that are seemingly irrelevant to the problem at hand. Third, the resources look for clues in the list of associations that help to generate novel ideas to solve the problem. An embodiment of the present invention encompasses the excursion activity and has a built in list of keywords, images, objects and identities for possible excursions.

One embodiment of the method allows for individuals to become resources of multiple groups. Such an individual could be a resource for a problem solving team working on one problem and another problem solving team working on another project. This embodiment involves the additional steps of setting up multiple folders on that individual's computer, whereby each folder represents a meeting with a distinct group list, process plan and group agenda. This individual could access each folder at random and work in a plurality of groups and activities simultaneously.

Another embodiment of the invention includes the additional steps of allowing group resources to access other applications from within this invention. For example, the ability to import documents or electronic presentations into a meeting may further assist in the creative problem solving process.

A third embodiment of the invention allows for the addition of an electronic connections pad that is private and unique to each group resource. Thus, a group resource may write down notes or comments for further refinement prior to submitting them to the scrutiny of the entire group. Group resources could write down notes in this connections pad, or copy and paste texts from one part of the invention into the connections pad or vice versa.

Another embodiment of the invention involves the creation and building of a discontinuous pass along story. As with the other embodiments of the invention this one also requires the provision and linking of computers into a network with each group resource having such a networked computer. One resource is designated as the facilitator, one or more as the client and the remainder as resources. The facilitator begins a story on an electronic discussion sheet. The electronic discussion sheet is exchanged through the network from resource to resource. Each resource may add to the story as it is passed around. The discussion sheet continues to be exchanged until the facilitator calls a halt to the exchange. Then, material from the story is used to "force fit" or suggest connections to some aspect of the problem or opportunity being addressed. In one alternative to this embodiment, each participant may be directed to start a discontinuous pass down story at the same time. In this manner there would be the same number of stories as participants. The facilitator would then shift all of the stories to new participants at one time. The stories would be continued until the facilitator halts the exchange. Thus, a high level of creative input can be elicited in a short amount of time. Because discontinuities are introduced into each story before they are passed along, this technique forces thinking outside of normal patterns and is thus, by definition, creative thought.

Various changes coming within the spirit of the invention may suggest themselves to those skilled in the art; hence the invention is not limited to the specific embodiment shown or described, but the same is intended to be merely exemplary. It should be understood that numerous other modifications and embodiments can be devised by those skilled in the art that will fall within the spirit and scope of the principles of the invention.

What is claimed is:

1. A computer-based method of innovatively solving one or more problems using a group having a plurality of participants gathered in a computerized meeting, a first participant being a client, who is the owner or is responsible for a problem or opportunity to be resolved, said method comprising:

providing each participant of each said group with a computer;

linking said computers together through a computer network;

creating a group list of all of said participants of said group;

designating a second participant of said group as a facilitator, said facilitator controlling an innovative problem solving process, including an agenda of said meeting;

designating the remaining participants as resources;

establishing said agenda and a process plan for said meeting, said agenda consisting of placeholders and activities;

stimulating and gathering creative springboards from said resources regarding a problem to be solved, said creative springboards entered by said participants into said participants' computers and distributed throughout said group through said computer network;

gathering, building and elaborating from said participants upon said springboards, said builds and elaborations entered by said participants into said participants' computers and distributed throughout said group through said computer network;

polling said participants' opinions about said springboards through a selection process, said polling accomplished through said participants entry of said opinions into said participants' computers and distributed throughout said group through said computer network;

selecting one or more beginning ideas from said springboards for further action, said beginning ideas selected on the basis of high newness and intrigue by entry by said participants into said participants' computers and distributed throughout said group through said computer network;

stimulating using an excursion process and gathering action oriented ideas to accomplish said beginning ideas, said action oriented ideas entered by said participants into said participants' computers and distributed throughout said group through said computer network;

selecting one or more of said action oriented ideas to become one or more emerging ideas, said action oriented ideas selected by entry by said participants into said participants' computers and distributed throughout said group through said computer network;

responding to said emerging ideas, said response in the form of a first and a second list, said first list identifying the positive aspects of said emerging ideas and said second list identifying concerns about said emerging ideas, said first list and said second list gathered through entry of said responses into said participants' computers and distributing said responses throughout said group through said computer network;

addressing and resolving said concerns identified about said emerging ideas using said excursion process to modify said emerging ideas;

identifying said modified emerging ideas as possible solutions if said emerging idea has an element of newness, said idea is feasible, and said group is committed to implementing said idea; and listing actions and assigning accountability and time lines to be taken to implement said possible solutions.

2. The computer-based method of innovatively solving one or more problems through one or more groups gathered in a computerized meeting as claimed in claim 1, wherein said excursion process comprises the steps of: putting the problem being worked on temporarily out of the minds of the resources; directing the resources to focus on one or more unrelated topic and to create a list of associations and thoughts based on said unrelated topic; and looking for clues in the list of associations to help generate novel ideas to solve said problem.

3. The computer-based method of innovatively solving one or more problems through one or more groups gathered in a computerized meeting as claimed in claim 2, wherein said unrelated topic comprises a keyword unrelated to the problem being solved.

4. The computer-based method of innovatively solving one or more problems through one or more groups gathered in a computerized meeting as claimed in claim 2, wherein said unrelated topic comprises an object unrelated to the problem being solved.

5. The computer-based method of innovatively solving one or more problems through one or more groups gathered in a computerized meeting as claimed in claim 2, wherein said unrelated topic comprises a new identity for the resources from which to address the problem being solved, said new identity unrelated to the problem being solved.

6. The computer-based method of innovatively solving one or more problems through one or more groups gathered in a computerized meeting in claim 1, wherein establishing said agenda further comprises:
   creating one or more task headlines to become a focus for said meeting; and
   creating a set of analysis highlights, said highlights providing said participants with specific information required to generate creative thought and connections about said task headlines.

7. The computer-based method of innovatively solving one or more problems through one or more groups gathered in a computerized meeting in claim 1, wherein creative springboards stimulated and gathered comprise single sentence responses to said task headlines in a form selected from the group of ideas, thoughts, connections, options and analogies.

8. The computer-based method of innovatively solving one or more problems through one or more groups gathered in a computerized meeting in claim 1, wherein said selection process comprises ranking said responses, based on high newness and intrigue, in order of preference and displaying said rankings in a form selected from the group consisting of matrixes, graphs and tables.

9. The computer-based method of innovatively solving one or more problems through one or more groups gathered in a computerized meeting in claim 1, wherein said selection process comprises rating said responses on a scale of one to ten and displaying said ratings in a form selected from the group consisting of matrixes, graphs and tables.

10. The computer-based method of innovatively solving one or more problems through one or more groups gathered in a computerized meeting in claim 1, wherein said selection process comprises indicating the extent of agreement on a five point scale and displaying voting results in a form selected from the group consisting of matrixes, graphs and tables.

11. The computer-based method of innovatively solving one or more problems through one or more groups gathered in a computerized meeting in claim 1, wherein said selection process comprises voting yes or no on each response.

12. The computer-based method of solving one or more problems through one or more groups gathered in a computerized meeting in claim 1, wherein said selection process comprises selecting one or more responses and displaying voting results in a form from the group consisting of matrixes, graphs and tables.

13. The computer-based method of solving one or more problems through one or more groups gathered in a computerized meeting in claim 1, further comprising an electronic whiteboard, said whiteboard allowing said members of said group to draw drawings, annotate said drawings, and edit said drawings.

14. The computer-based method of innovatively solving one or more problems through one or more groups gathered in a computerized meeting in claim 1, further comprising:
   establishing one or more folders on said group members' computers, said folders each comprising a distinct group list and a distinct agenda; and
   allowing said members to access said folders randomly, whereby a single individual may be a member of multiple groups simultaneously.

15. The computer-based method of innovatively solving one or more problems through one or more groups gathered in a computerized meeting in claim 1, further comprising allowing each of said members to add electronic links to other computer applications and to access said other computer applications.

16. The computer-based method of innovatively solving one or more problems through one or more groups gathered in a computerized meeting in claim 1, further comprising:
   creating an electronic connections pad for each of said members;
   accessing said electronic connections pad from each of said members' computers; and
   writing notes in said electronic connections pad.

17. A computer-based innovative problem solving process comprising:
   gathering a group of problem solvers;
   providing each member of said group with a computer;
   linking said computers together through a computer network;
   designating one member of said group as a facilitator and the remainder as participants, said facilitator beginning a discontinuous pass-along story to said participants;
   providing each participant with an electronic discussion sheet for the entry of a thought or connections relating to said story;
   electronically exchanging said electronic discussion sheet between participants, such that each participant has another participant's sheet;
   commenting by each participant on said electronic discussion sheet before said participant or adding a new thought to said electronic discussion sheet;
   using excursion processes to aid in the generation of creative thoughts or connections at any point in the innovative problem solving process when the participants' capacity for generating creative thoughts or connections has diminished; and
   continuing to exchange said electronic discussion sheets until said facilitator calls a halt to said exchange.

18. A computer system for creatively solving one or more problems through one or more groups of individuals gathered in a computerized meeting comprising:
   at least two computer terminals;
   a means for networking said computer terminals;
   a computerized means for establishing a process plan and an agenda for said meeting;
   a computerized means for gathering creative springboards about said problems from said individuals;
   a computerized means for gathering building and elaborating about said springboards from said individuals;
   a computerized means for polling said individuals opinion about said springboards, builds and elaborations;

a computerized means for selecting beginning ideas from said responses;

a computerized means for creating action oriented ideas to accomplish said beginning ideas;

a computerized means for selecting one or more of said action oriented ideas to become emerging ideas;

a computerized means of evaluating to said emerging ideas with benefits and concerns and a means for resolving said concerns;

a computerized means of identifying emerging ideas as possible solutions to said problem; and a computerized means of generating a list of actions to be taken, accountabilities and time lines to implement said possible solutions.

19. The computer system for creatively solving one or more problems through one or more groups of individuals gathered in a computerized meeting of claim 18, further comprising a means to allow participants to engage in excursion processes to aid in the generation of creative and novel ideas at any point in the problem solving process when the participants' capacity for generating new ideas has diminished.

20. The computer system for creatively solving one or more problems through one or more groups of individuals gathered in a computerized meeting of claim 19 further comprising a computerized means of allowing said individuals to exchange drawings, annotate drawings and edit drawings.

21. The computer system for creatively solving one or more problems through one or more groups of individuals gathered in a computerized meeting of claim 19 further comprising a computerized means of allowing said individuals to access other applications from within said computer system.

22. The computer system for creatively solving one or more problems through one or more groups of individuals gathered in a computerized meeting of claim 19 further comprising a computerized means of allowing each of said individuals to take notes in a private electronic notepad, said notepad not accessible by other individuals.

23. The computer system for creatively solving one or more problems through one or more groups of individuals gathered in a computerized meeting of claim 19 further comprising a computerized means for each of said individuals to belong to one or more of said groups and a computerized means to switch between each of said groups.

* * * * *